US006514326B1

(12) United States Patent
Hara et al.

(10) Patent No.: US 6,514,326 B1
(45) Date of Patent: Feb. 4, 2003

(54) CANISTER MODULE

(75) Inventors: Toshimi Hara, Hamakita (JP); Takenori Suzuki, Hamakita (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/890,137

(22) PCT Filed: Nov. 27, 2000

(86) PCT No.: PCT/JP00/08327

§ 371 (c)(1), (2), (4) Date: Jul. 26, 2001

(87) PCT Pub. No.: WO01/38715

PCT Pub. Date: May 31, 2001

(30) Foreign Application Priority Data

Nov. 26, 1999 (JP) .......................................... 11-335832

(51) Int. Cl.[7] ............................................... B01D 53/04

(52) U.S. Cl. ............................ 96/133; 96/147; 123/519

(58) Field of Search .......................... 96/121, 133, 147; 55/385.3, DIG. 19; 123/518, 519, 520, 521

(56) References Cited

U.S. PATENT DOCUMENTS

| | | | | |
|---|---|---|---|---|
| 5,474,595 A | * | 12/1995 | McCombs | 95/130 |
| 5,599,384 A | * | 2/1997 | Yoshida et al. | 123/519 |
| 5,681,370 A | * | 10/1997 | McMahon | 95/105 |
| 5,871,564 A | * | 2/1999 | McCombs | 95/100 |
| 6,343,591 B1 | * | 2/2002 | Hara et al. | 123/519 |

FOREIGN PATENT DOCUMENTS

JP 2-34750 3/1990

OTHER PUBLICATIONS

U.S. Patent Application Publication US 2001/0047723 A1 (figures 1–7), published Dec. 6, 2001.*

* cited by examiner

*Primary Examiner*—David A. Simmons
*Assistant Examiner*—Frank M. Lawrence
(74) *Attorney, Agent, or Firm*—Young & Thompson

(57) ABSTRACT

A canister module includes a canister housing in which a plurality of cylindrical adsorbent chambers filled with adsorbent are provided side by side with a gap therebetween. Canister-peripheral parts are connected to the adsorbent chambers through communicating openings provided on the canister housing and are in the gap.

17 Claims, 6 Drawing Sheets

CANISTER MODULE

This application is a 371 of PCT Application No. PCT/JP00/08327, filed Nov. 27, 2000.

TECHNICAL FIELD

The present invention relates to a canister module for treating fuel vapor generated from a fuel tank with adsorbent such as activated carbon or the like.

BACKGROUND OF THE INVENTION

As an apparatus for treating vapor generated from a fuel tank of a vehicle, there has conventionally been known a canister apparatus in which a recess portion (i.e., a gap) is provided between a pair of adsorbent chambers so as to extend to substantially the entire height of the adsorbent chambers so that heat of adsorption generated in each of the adsorbent chambers can be released also into the recess portion, thereby inhibiting temperature rise of adsorbent to prevent its adsorbing property from being degraded (see for example Japanese Utility Model Publication No. H6-27818).

One adsorbent chamber of the canister apparatus is provided with a tank-communicating opening, which communicates with the fuel tank, and with a purge port-communicating opening, which communicates with a fuel consumption system. The other adsorbent chamber is provided with an atmosphere-communicating opening. In addition, many kinds of peripheral parts are connected to the above-mentioned openings so as to control circulation and pressure of vapor. For example, a pressure control valve or the like for controlling the internal pressure of the fuel tank is connected to the tank-communicating opening. A filter apparatus or the like for removing dust in the air, which is to be introduced into the adsorbent chambers, is connected to the atmosphere-communicating opening. These components, which are composed as separate parts from the canister apparatus, are mounted fixedly in the vicinity of a housing of the canister apparatus by means of supporting members such as stays or the like. There is a case where some of peripheral parts are received in a separate vessel from the housing of the canister apparatus to provide a unit and such a unit is secured in the vicinity of the canister apparatus.

However, in the conventional setting structure of the peripheral parts, the parts are required to be independently secured on the wall or the like of an engine room, leading not only to increase in the number of the parts, but also to time consuming operations, thus increasing a cost. Even when the peripheral parts are composed as a unit with utilization of a plastic housing, the number of the parts inevitably increases due to addition of the plastic housing.

When the recess portion is provided between the adsorbent chambers of the canister apparatus, the width of the canister apparatus increases, leading to increase in space required for installation of the canister apparatus. In such a circumstance, arrangement of the many kinds of peripheral parts around the canister apparatus occupies a considerable space of the engine room due to such devices and parts, exerting possibly an influence on arrangement of the other parts.

DISCLOSURE OF THE INVENTION

An object of the present invention is to provide a canister module in which a canister housing, peripheral parts and the like relevant to a canister are put together into a compact body, thus making it possible to decrease not only a space required to mount these parts on a vehicle, but also the number of the parts.

In order to attain the aforementioned object, a canister module of the present invention comprises: a canister housing in which a plurality of adsorbent chambers filled with adsorbent are provided side by side so that a gap is formed between opposite side walls for defining the adsorbent chambers, different parts from interior parts received in said canister housing are received in said gap.

According to such a structure, it is possible to effectively release heat of adsorption generated in the adsorbent chambers outside the chambers in the same manner as the conventional apparatus, because of the gap provided between the opposite side walls, which define the adsorbent chambers. Moreover, the different parts from the interior parts, which are received in the canister housing, are received in the gap provided between the adsorbent chambers so that the gap can be utilized effectively as a receiving space for the parts, in addition to radiation purpose of heat. Accordingly, the canister housing and the different parts can be put together into a single module, thus making it possible to decrease a space required to mount them. Such a compact unit structure causes the support member or the like to be commonly used to mount the different parts or to be omitted, leading to the decreased number of the parts and permitting reduction in cost.

In the canister module of the present invention, canister-peripheral parts serving as the different parts, which are connected to the adsorbent chambers through communicating openings provided on the canister housing, may be received in the above-mentioned gap. According to such a structure, it is possible to mount detachably the canister housing and the peripheral parts, which are to be connected to the communicating openings of the canister housing, on a vehicle in an assembled state. It is therefore possible to carry out easily a mounting operation or a removing operation on the vehicle in comparison with a case where connecting operations for communicating openings and peripheral parts are carried out after they are mounted on a vehicle.

The canister module of the present invention may further comprise a support member, which is detachable relative to the canister housing, and the canister-peripheral parts may be secured on the support member. In addition, the other canister-peripheral parts may be secured on the support member. Any parts other than the canister-peripheral parts may be secured on the support member. According to such a structure, it is possible to secure a plurality of canister-peripheral parts and the like on the single support member to provide a sub-assembly. Such a sub-assembly can be mounted on the canister housing so that many kinds of parts can easily be incorporated into the gap of the housing.

At least part of the support member may be put into the above-mentioned gap, and the canister-peripheral parts may be secured on the part, which is put into the gap. According to such a structure, it is possible to receive easily the canister-peripheral parts in the gap of the canister housing.

The part of the support member, which is put into the gap, may have vertical wall portions extending along the side walls of the adsorbent chambers and a cross portion for connecting the vertical wall portions. According to such a structure, it is possible to prevent the support member from improperly moving within the gap, permitting to hold securely the canister-peripheral parts.

In the present invention, it is possible to cause the canister-peripheral parts received in the gap or the support member to function as a device for releasing heat of adsorption in the adsorbent chambers into the above-mentioned gap, by for example forming the canister-peripheral parts and the support member of material having a high thermal conductivity or adopting a shape by which a high heat radiation effect can be provided.

The term "canister module" used in the present invention means an object in which a canister apparatus composed of the canister housing and internal parts received therein and the above-mentioned different parts are put together into a single module.

BEST MODE FOR CARRYING OUT THE INVENTION

Figure 1:
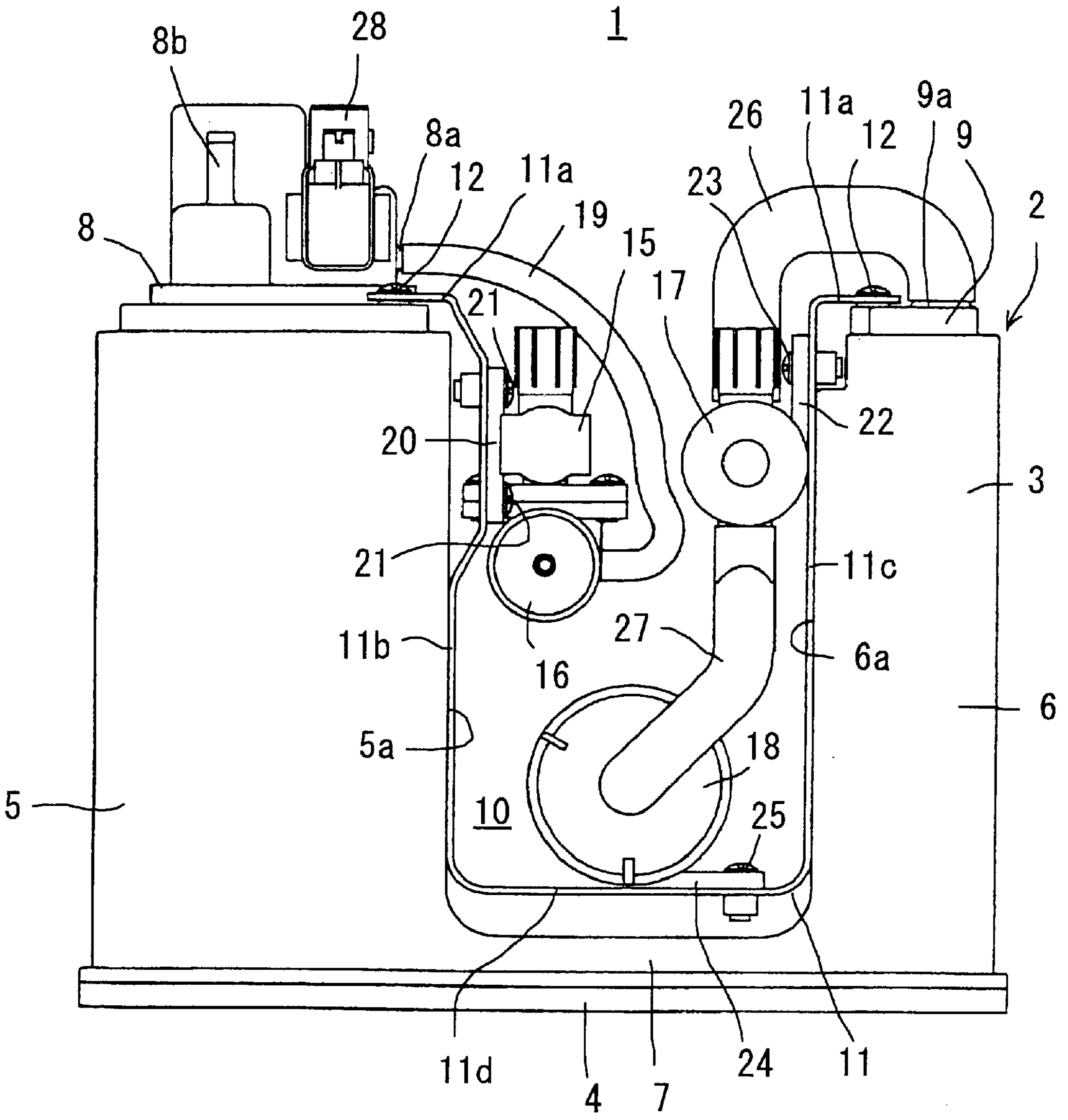
FIG. 1 is a view illustrating an example of a canister module of an embodiment of the present invention.

FIG. 1 illustrates a: canister module of an embodiment of the present invention. The canister module 1 has a canister housing 2 formed of plastic. The canister housing 2, which is typically a formed body of plastic, is composed of a case body 3 and a lower cover 4 for closing the lower opening of the base body 3. The case body 3 has a pair of cylindrical portions 5, 6. The inside of each of the cylindrical portions 5, 6 is utilized as an adsorbent chamber, which is filled with adsorbent. Activated carbon is typically used as the adsorbent, although it is natural that the present invention is not limited only to this. A connecting portion 7 is provided at the lower ends of the cylindrical portions 5, 6. The adsorbent chambers in the inside of the cylindrical portions 5, 6 communicate with each other through the interior space of the connecting portion 7 so as to permit circulation of air and fuel vapor between the both chambers.

The upper ends of the cylindrical portions 5, 6 are closed by means of upper covers 8, 9, respectively. The upper cover 8 is provided with a tank-communicating opening 8*a* and a purge port-communicating opening 8*b*. The upper cover 9 is provided with an atmosphere-communicating opening 9*a*. The upper covers 8, 9 may be manufactured in a separate process from that for the cylindrical portions 5, 6 and then assembled, or may be integrally formed with the cylindrical portions 5, 6. The upper cover 8 may be provided in its inside with a liquid collector for storing liquid component of fuel, which flows from the tank-communicating opening 8*a*.

A recess portion (i.e., a gap) 10 is provided between the opposite side walls 5*a*, 6*a* of the cylindrical portions 5, 6 so as to extend from the upper ends of the cylindrical portions 5, 6 toward the connecting portion 7. The recess portion 10 opens upward at its upper end of the canister housing 2 as well as in the transverse direction (i.e., the direction perpendicular to a plane of the paper of the figure) at the opposite side ends. The recess portion 10 receives an U-shaped bracket 11. The bracket 11 is provided at the upper ends with flanges 11*a*, 11*a*, which project from the recess portion 10. These flanges 11*a*, 11*a* are fixed on the upper covers 8, 9 by means of attaching screws 12, 12, respectively so that the bracket 11 is suspended within the recess portion 10.

Some canister-peripheral parts are secured on the bracket 11. In the example as shown in FIG. 1, a bypass solenoid valve 15 and a two-way valve 16 are fixed on one vertical wall portion 11*b* of the bracket 11 with the use of a base plate 20 and attaching screws 21. A bent-shut-solenoid valve 17 is fixed on the other vertical wall port on 11*c* with the use of a base plate 22 and an attaching screw 23. A canister filter 18 is fixed on the bottom wall portion 11*d* with the use of a base plate 24 and an attaching screw 25.

The bypass solenoid valve 15, which is connected to a fuel tank (not shown), can open or close a fluid passage for introducing fuel vapor from the fuel tank into the canister housing 2. The two-way valve 16 is used to maintain the internal pressure of the fuel tank within an appropriate range. The two-way valve 16 has an internal passage. The one end of the internal passage is connected to the bypass solenoid valve 15 and the other end thereof is connected to the tank-communicating opening 8*a* through a tube 19. The bent-shut-solenoid valve 17, which is connected to the atmosphere-communicating opening 9*a* through a tube 26, can open or close a communicating passage for air between the inside and outside of the canister housing 2 through the atmosphere-communicating opening 9*a*. The canister filter 18 is used to filter air, which is introduced from the atmosphere-communicating opening 9*a* into the housing 2, during a purge treatment (i.e., a treatment for causing a negative pressure to be generated in the purge port-communicating opening 8*b* so as to introduce air from the atmosphere-communicating opening 9*a* into the housing 2, thereby removing fuel constituent adsorbed by adsorbent). The canister filter 18 has an internal passage. The end of the internal passage is connected to the bent-shut-solenoid valve 17 through a tube 27 and the other end thereof communicates with the air (not shown). In addition, the upper cover 8 is provided with a pressure sensor 28 for detecting pressure of fuel vapor supplied from the fuel tank.

According to the above-described structure, the recess portion 10 formed as the gap between the adsorbent chambers can be utilized as a space for receiving the parts 15 to 18 so that the canister apparatus and the peripheral parts can be put together into a module serving as a single united body. It is therefore possible to decrease a space required for installation of them on a vehicle. There is no need to provide individually support members such as brackets for the parts 15 to 18, thus decreasing the number of the parts. These parts 15 to 18 are fixed on the common bracket 11. As a result, it is possible to fix these parts 15 to 18 on the bracket 11 and carry out a connecting operation for these parts prior to the fixing of the bracket 11 to the housing 2 so that these peripheral parts can be assembled into a so-called sub-assembly. Then, the placement of the bracket 11 in the recess portion 10 and the fixation of it on the housing 2 will suffice. It is therefore possible to carry out easily not only a fixing operation of the parts, but also a maintenance and exchange operation. The bracket 11 may be formed of material having a high thermal conductivity or may have a shape by which a high heat radiation effect can be provided, thus improving heat radiation property from the adsorbent chambers into the recess portion 10.

Figure 2:
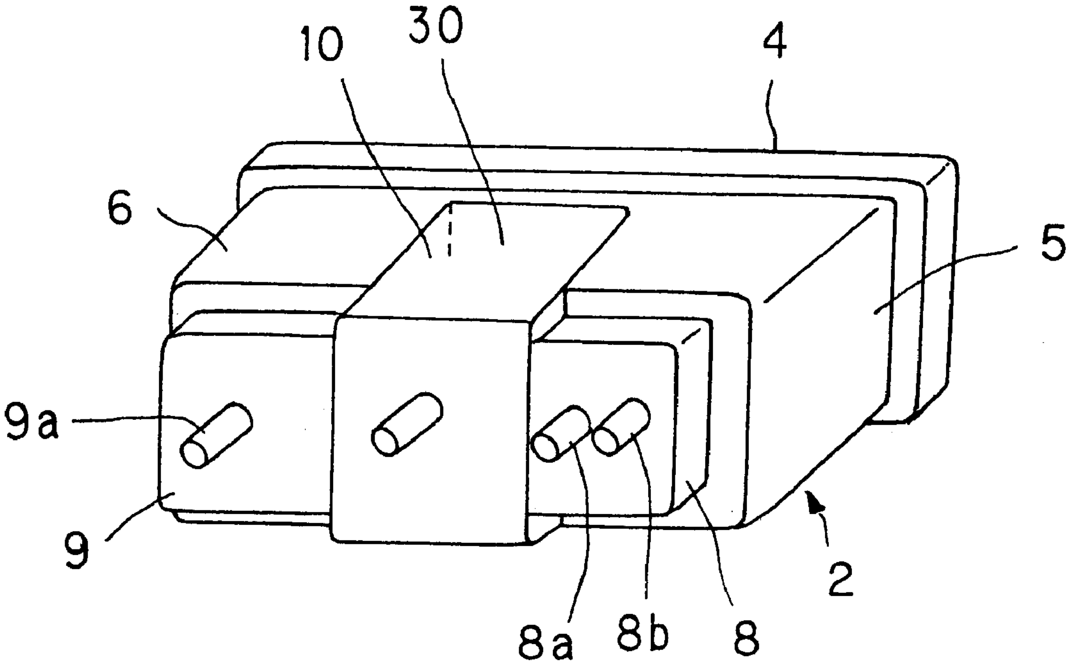
FIG. 2 is a view illustrating a modification of the module as shown in FIG. 1.

The present invention, which is not limited only to the above-described embodiment, may be carried out in the form of the other embodiments. For example, the recess portion 10 may be completely closed by means of a bracket 30 as shown in FIG. 2, thus improving a rust prevention property and the like of the peripheral parts. In this case, arrangements are preferably made so as to effectively radiate heat, which is transferred from the adsorbent chambers to the recess portion, outside the bracket 30.

Figure 3:
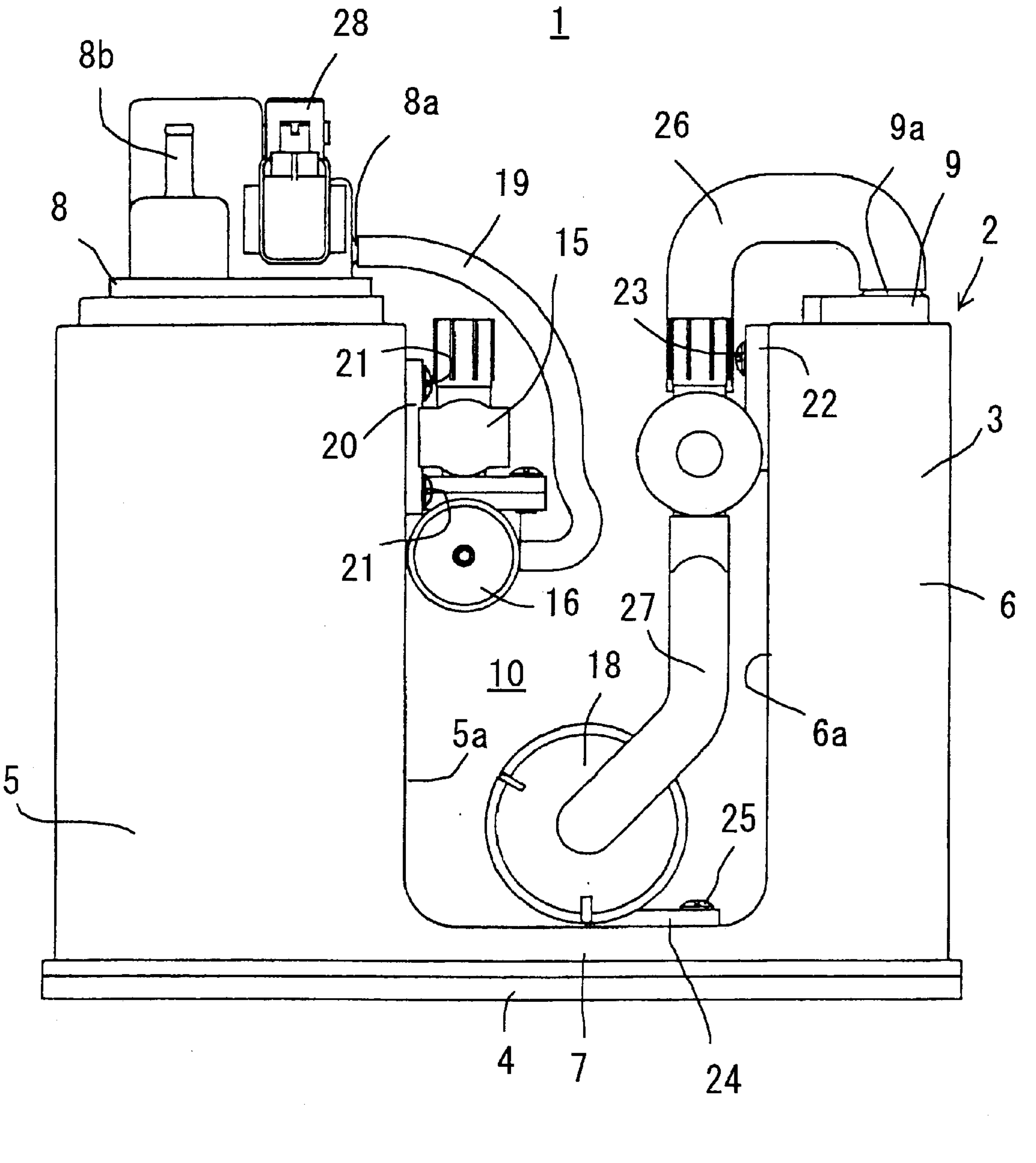
FIG. 3 is a view illustrating an embodiment in which canister-peripheral parts are secured on the wall portion defining a recess portion.

FIGS. 3 to 6 illustrate the other embodiment of the present invention. The same reference numerals are given to components in these figures, which are common in the other figures. In the embodiment as shown in FIG. 3, the bracket 11 as shown in FIG. 1 is omitted. A bypass solenoid valve 15 and a two-way valve 16 are fixed on the side wall 5*a* of the cylindrical portion 5 with the use of a base plate 20 and attaching screws 21. A bent-shut-solenoid valve 17 is fixed on the side wall 6*a* of the cylindrical portion 6 with the use of a base plate 22 and an attaching screw 23. A canister filter 18 is fixed on the upper wall 7*a* of the connecting portion 7 with the use of a base plate 24 and an attaching screw 25. Also in such an embodiment, the base plates 20, 22 and 24 serving as support members may be formed of material having a high thermal conductivity or may have a shape by which a high heat radiation effect can be provided, thus improving heat radiation property from the adsorbent chambers into the recess portion 10.

Figure 4:
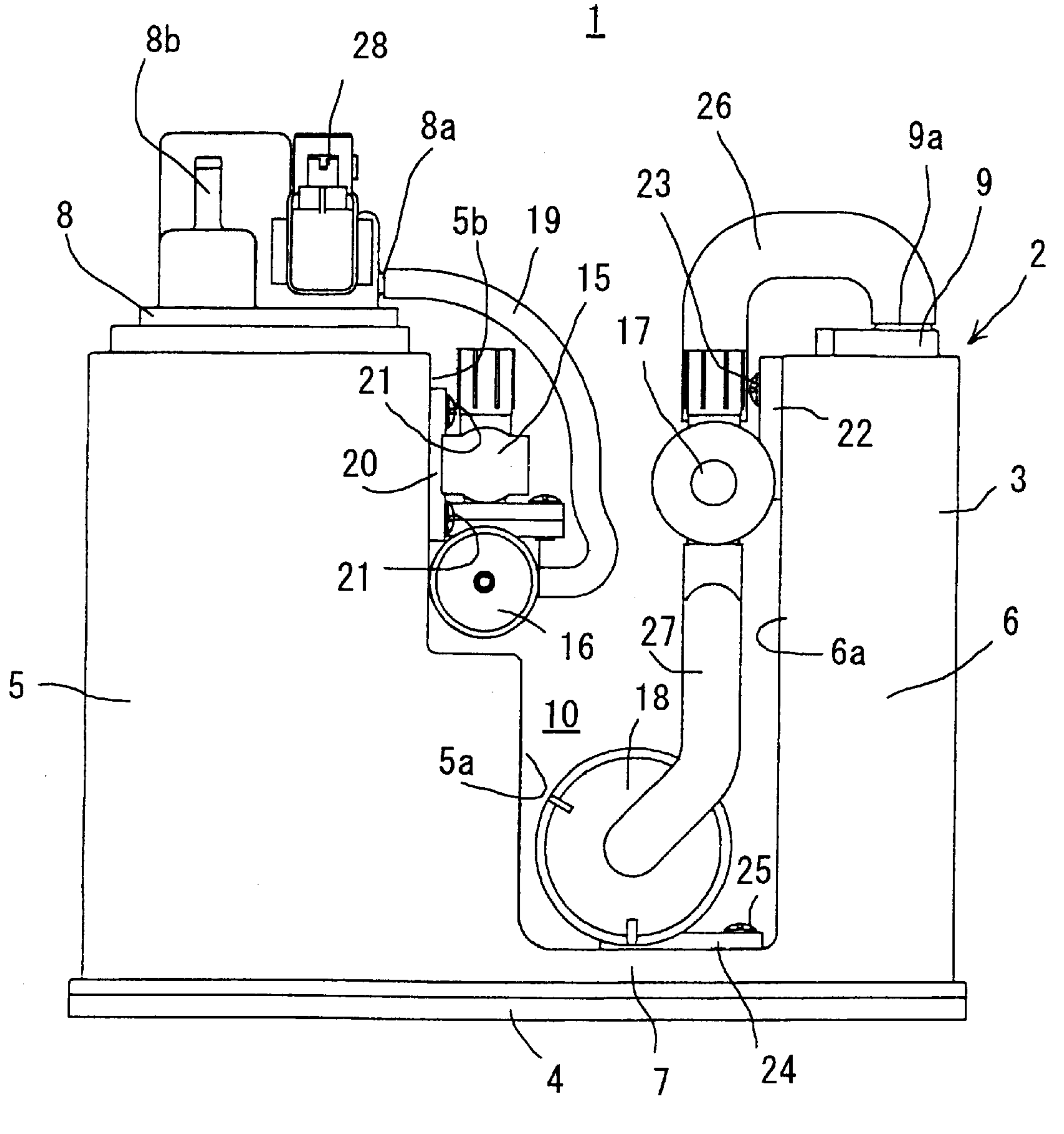
FIG. 4 is a view illustrating an embodiment in which an additional recess is provided in a part of the recess portion to increase a surface area of the housing so that heat radiation property into the recess portion can be improved.

In the embodiment as shown in FIG. 4, one cylindrical portion 5 is provided at its upper portion with a recess portion 5*b* in which a bypass solenoid valve 15 and a two-way valve 16 are fixed with the use of a base plate 20 and attaching screws 21. The other parts 17, 18 are in the same fixing condition as those in FIG. 3. In this embodiment, provision of the recess portion 5*b* causes the surface area of the housing to increase, thus facilitating heat radiation into the recess portion 10.

Figure 5:
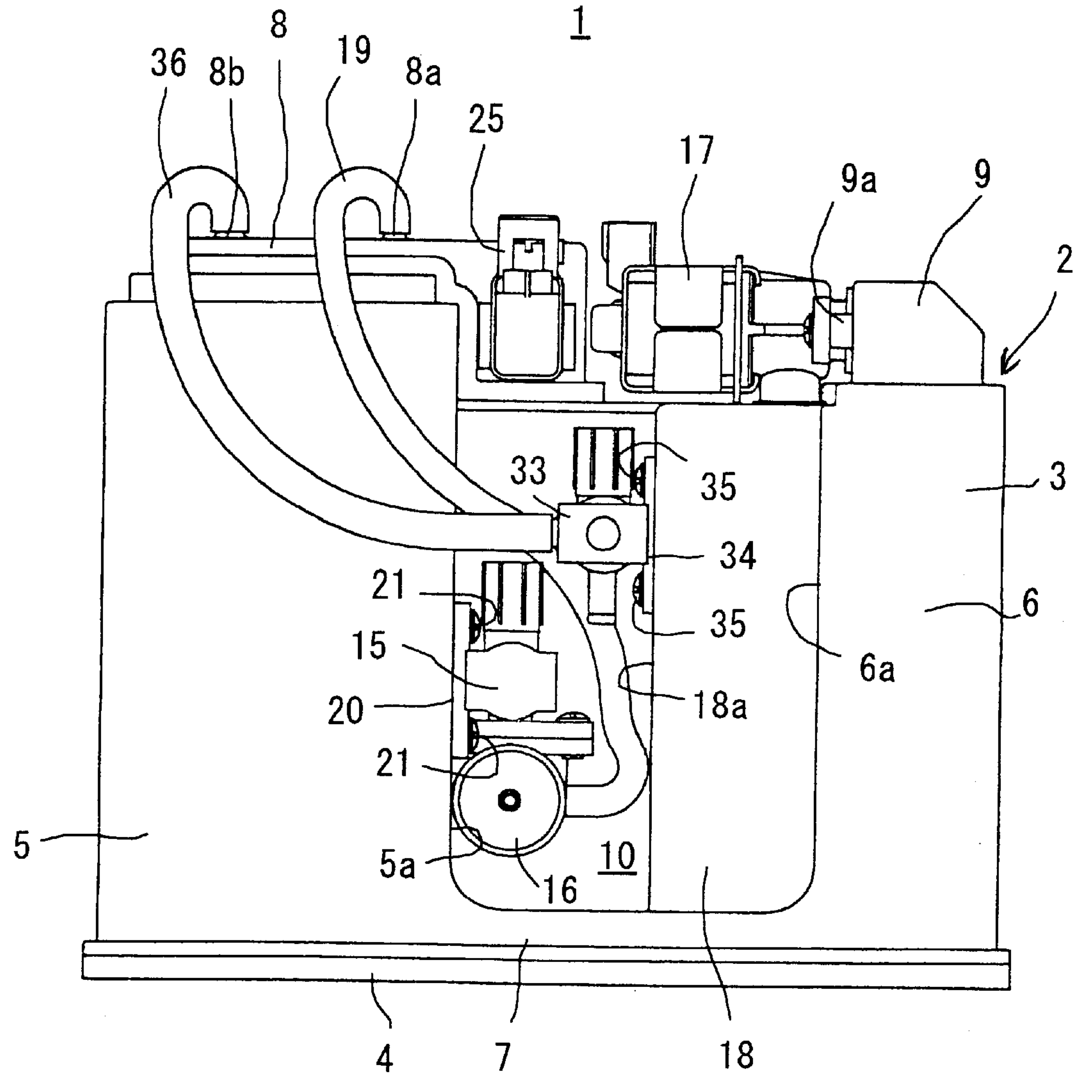
FIG. 5 is a view illustrating an embodiment in which a securing structure for a canister filter is revised.

In the embodiment as shown in FIG. 5, a bypass solenoid valve 15 and a two-way valve 16 are fixed on the side wall 5*a* of the cylindrical portion 5 with the use of a base plate 20 and attaching screws 21. A canister filter 18 is fixed on the side wall 6*a* of a cylindrical portion 6 so as to come into contact with the side wall 6*a* and extend to substantially the entire height thereof. In addition, a purge solenoid valve 33 is fixed on the side wall 18*a* of the canister filter 18 with the use of a base plate 34 and attaching screws 35, 35. The purge solenoid valve 33, which is connected to the purge-port communicating opening 8*b* through a tube 36, can open or close a passage connecting the purge-port communicating opening 8*b* to a purge port (not shown). In such an embodiment, the housing of the canister filter may be formed of material having a high thermal conductivity or may have a shape by which a high heat radiation effect can be provided, thus improving heat radiation property from the adsorbent chambers into the recess portion 10.

Parts received in the recess portion 10 are not limited only to those in the above-described embodiments and the other parts may be received in the recess portion 10. Some of auxiliary parts for mounting the canister housing 2 in the engine room may for example be received in the recess portion 10. Some of parts (for example, a casing or housing) to be received in the recess portion 110 may be integrally formed with the canister housing 2 in the same forming process. The recess portion 10 may be provided with a heat-exchanging element such as fins or the like for facilitating heat radiation from the adsorbent chambers. Heat capacity of the bracket 11 and the base plates 20, 22 and 24 may be increased by increasing for example the thickness of them, so as to utilize the support members as a heat sink. Heat capacity of the peripheral parts such as a canister filter 18 may be increase so as to utilize the peripheral parts as the heat sink.

Figure 6:
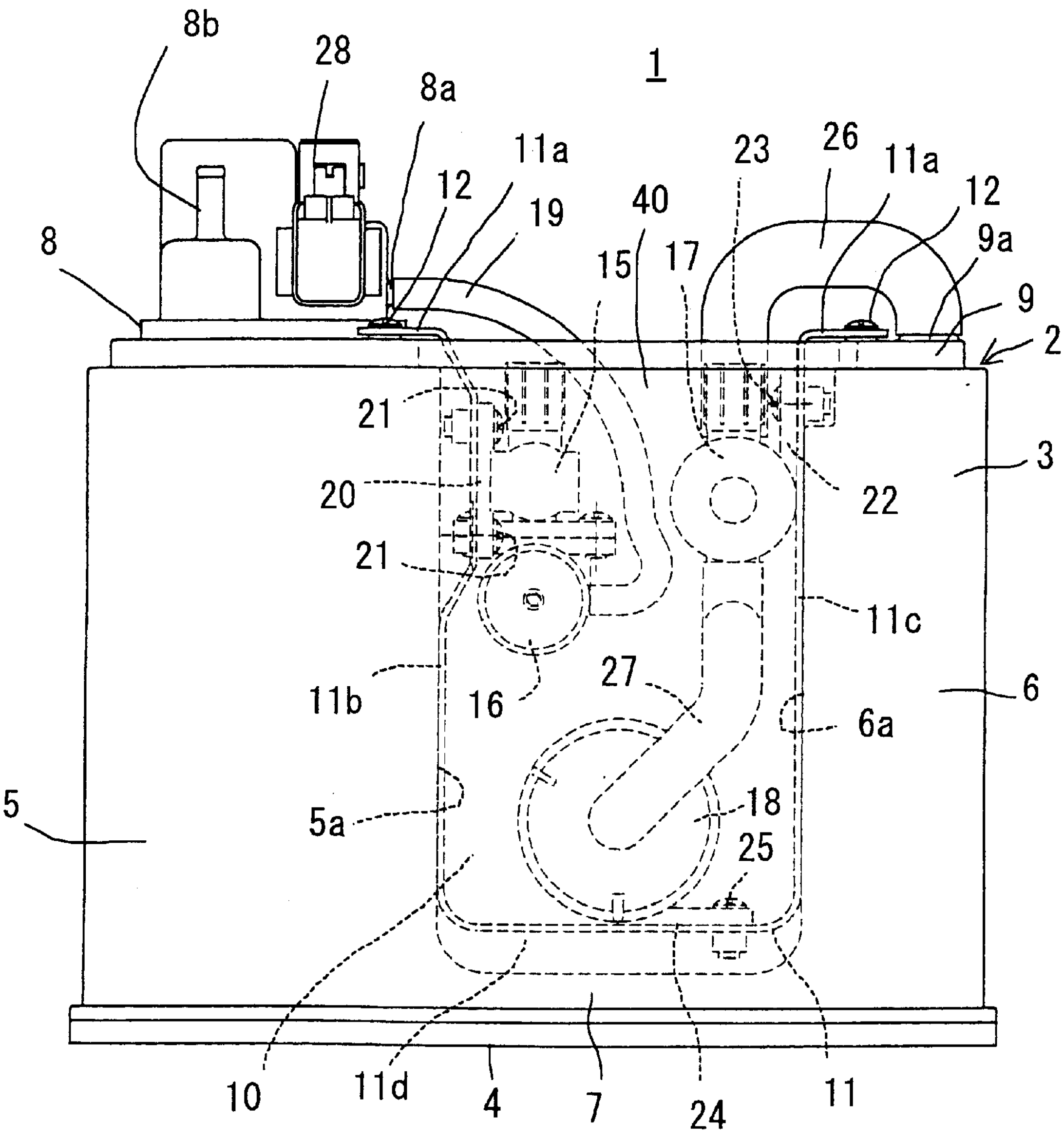
FIG. 6 is a view illustrating an embodiment in which one of side openings of the recess portion is closed by means of a connecting wall.

The recess portion 10 is not limited only to the shape as shown in FIG. 1. The recess portion 10 may be closed by means of a connection wall 40, which connects the cylindrical portions 5*a* and 6*a* to each other, as shown in FIG. 6.

According to the present invention as described in detail, the canister housing and the different parts can be put together into a single module, thus making it possible to decrease a space required to mount them. Such a compact unit structure causes the support member or the like to be commonly used to mount the different parts or to be omitted, leading to the decreased number of the parts and permitting reduction in cost.

What is claimed is:

1. A canister module comprising:

two cylindrical housings that each contain a chamber with an adsorbent, said housings having generally parallel longitudinal axes and being spaced from each other with a floor therebetween so that sidewalls of said chambers and said floor define a passageway between said two housings, said passageway extending in opposite directions perpendicular to a plane containing said longitudinal axes and in a direction away from said floor; and components for operating said module attached within said passageway to at least one of said sidewalls and said floor so as to leave a heat radiation space within said passageway between said components.

2. The canister module of claim 1, wherein one of said chambers is connected to outside air through a filter and another of said chambers is connected to a vapor source through a valve, and wherein said components comprise said filter and said valve.

3. The canister module of claim 2, further comprising a second valve between said filter and said one of said chambers, said second valve being within said passageway.

4. The canister module of claim 2, wherein each of said housings further comprises a vapor opening in an end thereof opposite said floor, and further comprising a first hose that leads from said filter within said passageway to one said vapor opening and a second hose that leads from another said vapor opening to said valve within said passageway.

5. The canister module of claim 1, further comprising a generally U-shaped mounting bracket within said passageway and attached outside said passageway to ends of said housings opposite said floor.

6. The canister module of claim 5, wherein one of said chambers is connected to outside air through a filter and another of said chambers is connected to a vapor source through a valve, and wherein said components comprise said filter and said valve which are within said passageway and attached to said bracket so as to leave the heat radiation space in said passageway.

7. The canister module of claim 1, further comprising plural mounting brackets within said passageway and attached to at least one of said sidewalls and said floor.

8. The canister module of claim 7, wherein one of said chambers is connected to outside air through a filter and another of said chambers is connected to a vapor source through a valve, and wherein said components comprise said filter and said valve which are within said passageway and attached to a respective one of said mounting brackets so as to leave the heat radiation space in said passageway.

9. The canister module of claim 1, further comprising a cover for closing the passageway in the opposite directions perpendicular to the plane containing said longitudinal axes and in the direction away from said floor.

10. A canister module comprising:

two cylindrical housings that each contain a chamber with an adsorbent, said housings having generally parallel longitudinal axes and being spaced from each other with a floor therebetween so that sidewalls of said chambers and said floor define a gap between said two housings, said chambers of said two housings being in vapor communication with each other through a path in said floor;

one of said chambers being connected to outside air through a filter and another of said chambers being connected to a vapor source through a valve; and a generally U-shaped mounting bracket within said gap and attached outside said gap to ends of said housings opposite said floor, each of said filter and said valve being within said gap and attached to said bracket so as to leave a heat radiation space in said gap.

11. The canister module of claim 10, further comprising a second valve between said filter and said one of said chambers, said second valve being within said gap and attached to said bracket.

12. The canister module of claim 10, wherein each of said housings further comprises a vapor passage in the end thereof opposite said floor, and further comprising a first hose that leads from said filter within said gap to one said vapor passage and a second hose that leads from another said vapor passage to said valve within said gap.

13. The canister module of claim 10, wherein said bracket is spaced from said floor so as to provide a heat radiation space.

14. The canister module of claim 10, further comprising a cover for closing said gap in the opposite directions perpendicular to the plane containing said longitudinal axes and in the direction away from said floor.

15. A canister module comprising:

two cylindrical housings that each contain a chamber with an adsorbent, said housings having generally parallel longitudinal axes and being spaced from each other with a floor therebetween so that sidewalls of said chambers and said floor define a gap between said two housings, said chambers of said two housings being in vapor communication with each other through a path in said floor;

one of said chambers being connected to outside air through a filter and another of said chambers being connected to a vapor source through a valve; and plural mounting brackets within said gap and attached to at least one of said sidewalls and said floor, each of said filter and said valve being within said gap and attached to a respective one of said brackets so as to leave a heat radiation space in said gap.

16. The canister module of claim 15, further comprising a second valve between said filter and said one of said chambers, said second valve being within said gap and attached to one of said brackets.

17. The canister module of claim 15, wherein each of said housings further comprises a vapor passage in the end thereof opposite said floor, and further comprising a first hose that leads from said filter within said gap to one said vapor passage and a second hose that leads from another said vapor passage to said valve within said gap.

* * * * *